(12) United States Patent
Priepke

(10) Patent No.: US 7,481,612 B2
(45) Date of Patent: Jan. 27, 2009

(54) AUTOMATIC ROBOTIC BIG BALE LOADER, HAULER AND STACKER HAVING MAST-TYPE BALE MANIPULATION MECHANISM

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 263 days.

(21) Appl. No.: 11/061,939

(22) Filed: Feb. 19, 2005

(65) Prior Publication Data

US 2006/0188363 A1 Aug. 24, 2006

(51) Int. Cl.
- *A01D 90/08* (2006.01)
- *B60P 1/00* (2006.01)
- *B60B 29/00* (2006.01)

(52) U.S. Cl. ............... 414/111; 414/501; 414/24.5; 414/427

(58) Field of Classification Search .......... 414/471, 414/543, 392, 399, 541, 665, 635, 24.5, 111
See application file for complete search history.

(56) References Cited

U.S. PATENT DOCUMENTS

| | | | | |
|---|---|---|---|---|
| 3,858,735 | A * | 1/1975 | Zrostlik | 414/427 |
| 4,076,138 | A | 2/1978 | Honomichl, Sr. | 214/518 |
| 4,282,969 | A | 8/1981 | Zipser | 198/747 |
| 4,329,102 | A | 5/1982 | Gray | 414/24.5 |
| 4,370,796 | A | 2/1983 | Wilson | 29/564.3 |
| 4,459,075 | A | 7/1984 | Eichenberger | 414/24.5 |
| 4,498,829 | A * | 2/1985 | Spikes | 414/24.5 |
| 4,552,501 | A * | 11/1985 | Clark et al. | 414/486 |
| 4,604,018 | A | 8/1986 | Kruse | 414/44 |
| 4,789,289 | A | 12/1988 | Wilson | 414/24.6 |
| 4,881,865 | A * | 11/1989 | Herolf | 414/550 |
| 5,607,274 | A * | 3/1997 | Cook | 414/111 |
| 5,755,547 | A * | 5/1998 | Flerchinger et al. | 414/408 |
| 5,829,233 | A | 11/1998 | Stirling | 53/567 |
| 5,882,163 | A | 3/1999 | Tilley | 414/111 |
| 5,975,832 | A * | 11/1999 | Winkler | 414/555 |
| 6,289,783 | B1 * | 9/2001 | Sagaser et al. | 91/427 |
| 6,312,205 | B1 | 11/2001 | Vandenberg | 414/24.5 |
| 6,881,021 | B1 * | 4/2005 | Winter et al. | 414/420 |

* cited by examiner

*Primary Examiner*—Saúl J Rodriguez
*Assistant Examiner*—Gregory W Adams
(74) *Attorney, Agent, or Firm*—Patrick M. Sheldrake; John William Stader; Michael G. Harms

(57) ABSTRACT

A large rectangular bale loading, hauling and stacking vehicle that mounts on a production truck chassis. Loading is accomplished with a bale manipulator that can selectively pick up and rotate bales, depositing them in tiers on a load rack, some in tie tiers. The manipulator works in conjunction with a transverse pivoting mast along the length of which the manipulator is selectively movable. A stack of bales is thus formed on the load rack and later deposited at a storage site.

27 Claims, 13 Drawing Sheets

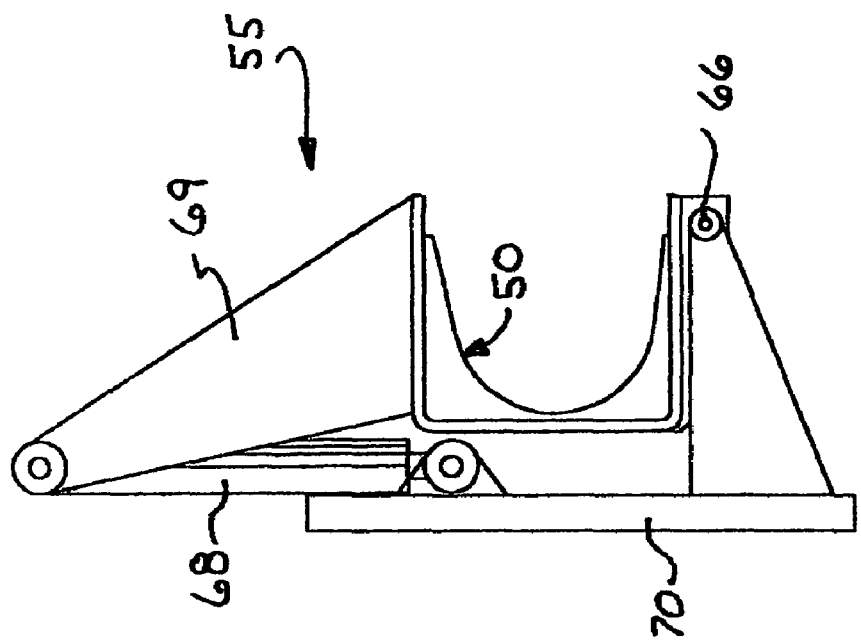
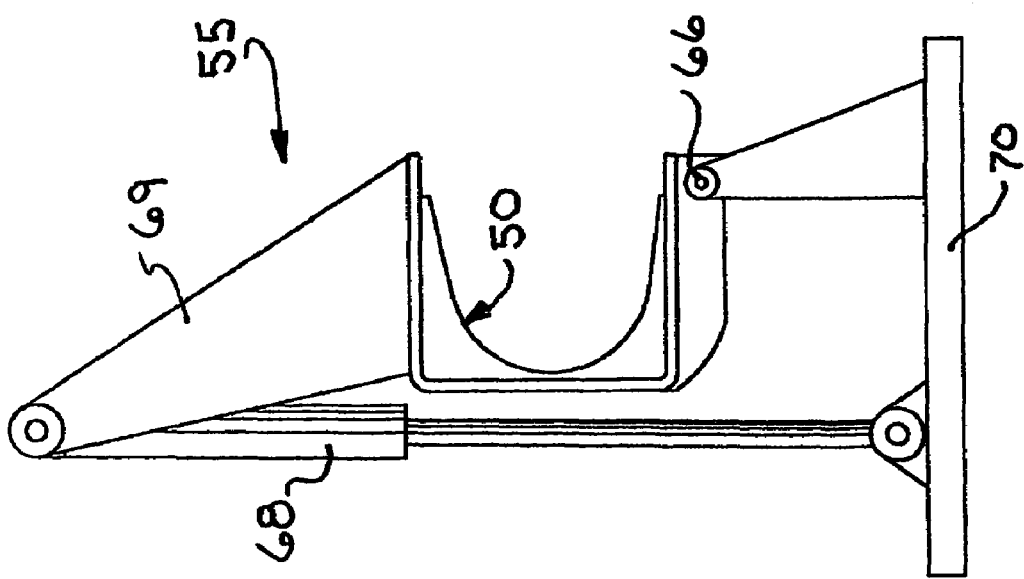
FIG.4b
FIG.4a

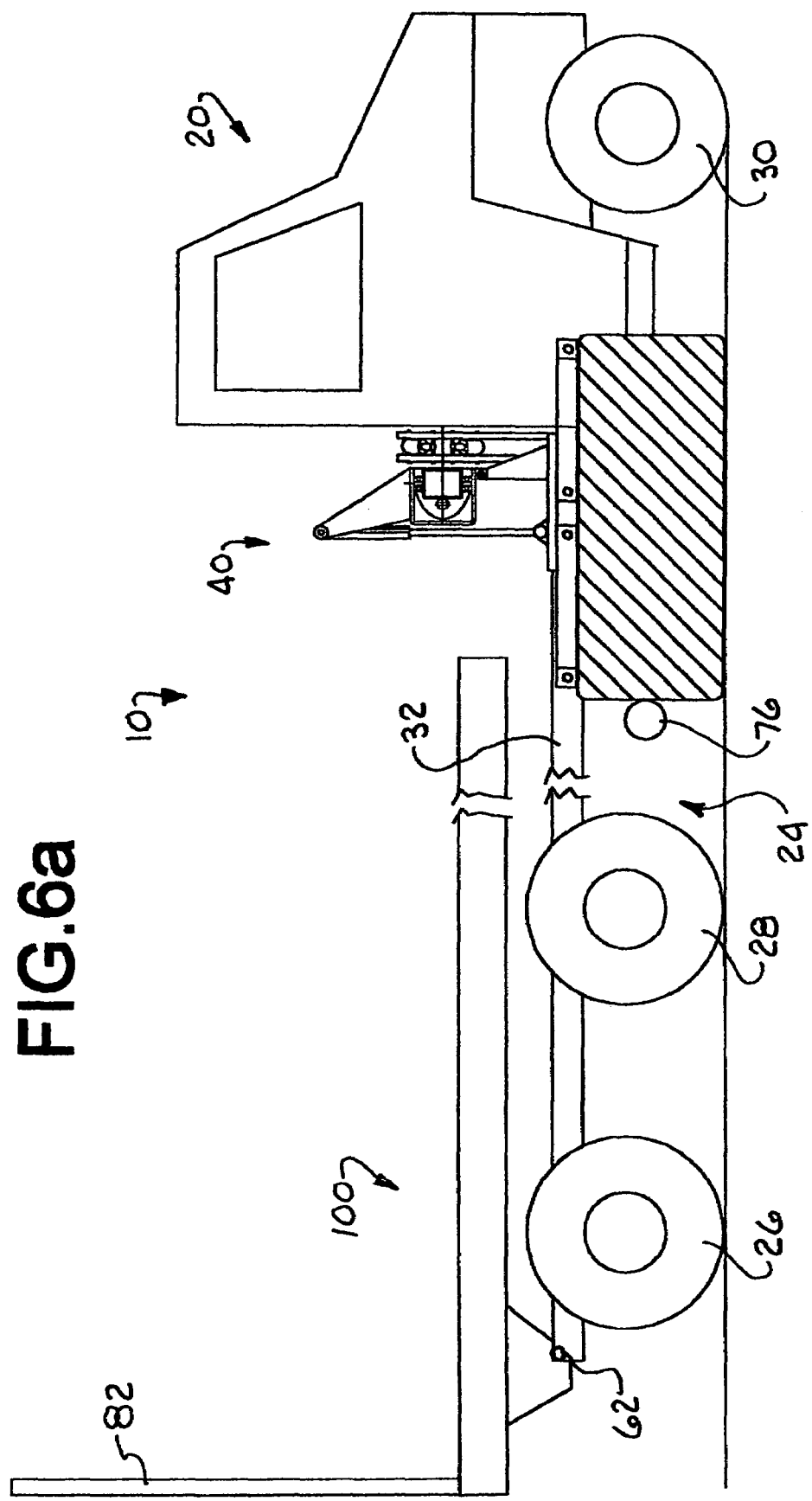

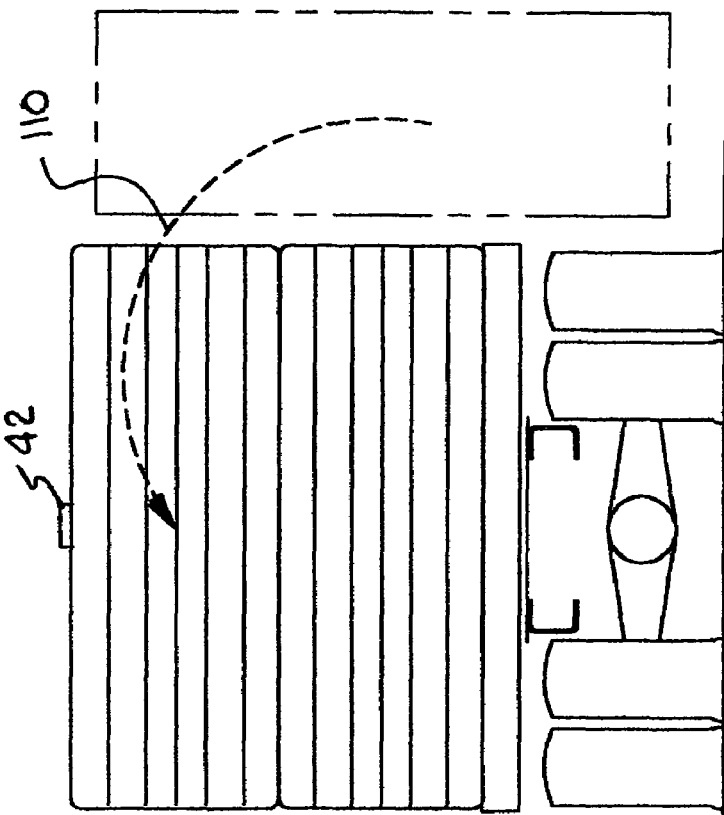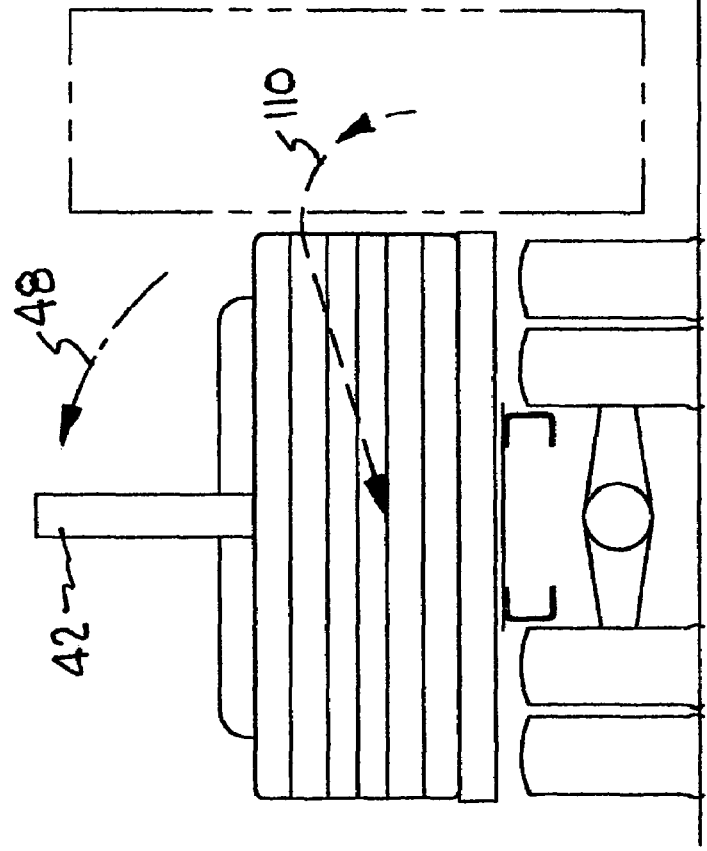

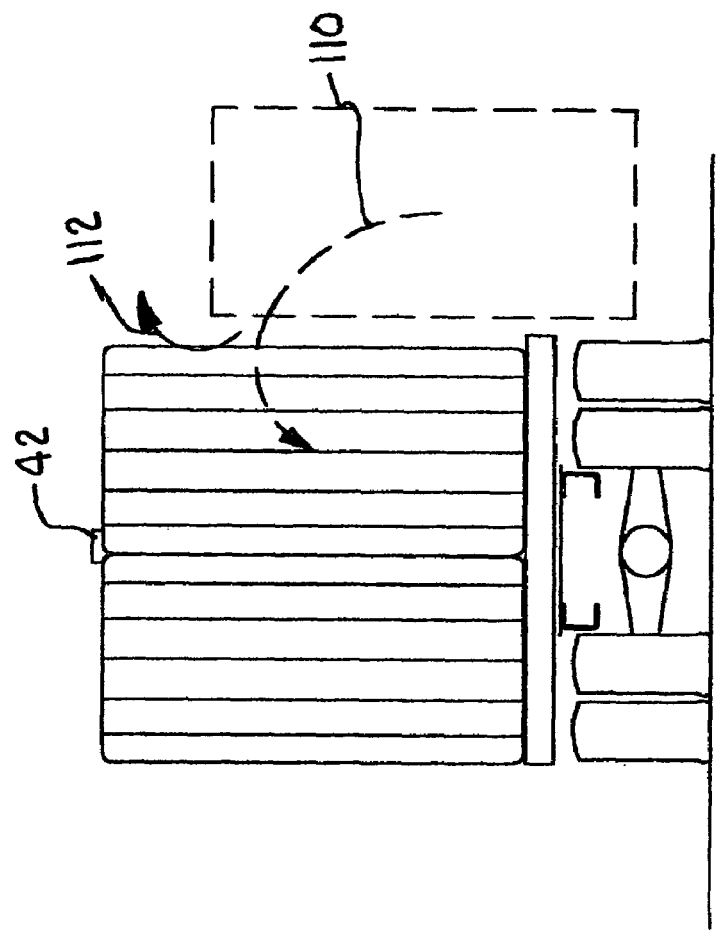
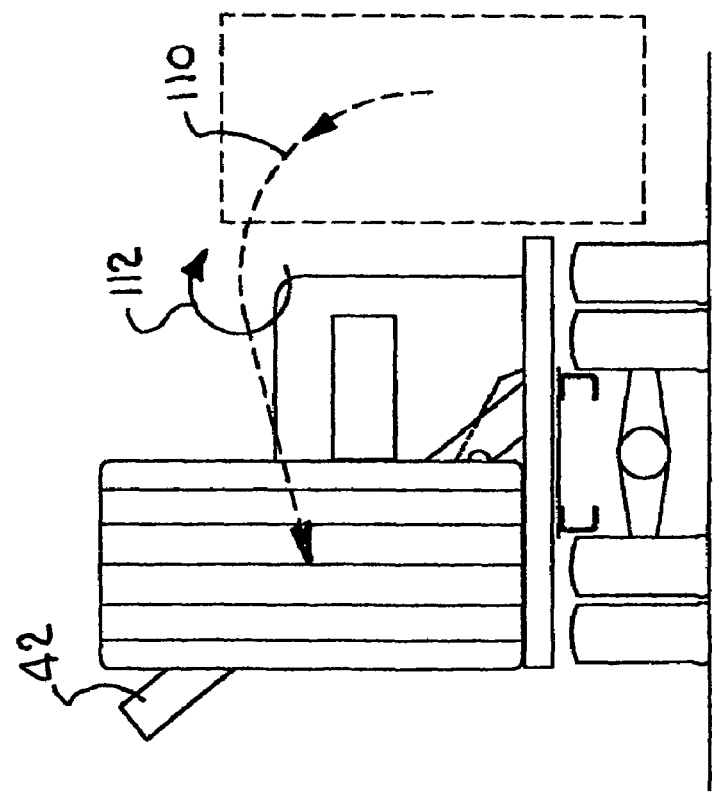

AUTOMATIC ROBOTIC BIG BALE LOADER, HAULER AND STACKER HAVING MAST-TYPE BALE MANIPULATION MECHANISM

BACKGROUND OF THE INVENTION

The present invention relates generally to agricultural self-propelled bale handling machines, and more particularly to such a machine that loads, hauls and stacks big bales.

A large proportion of the resources and time of the agricultural industry is directed toward the production of feed for animals, and most specifically to the production of baled stem and leaf crops such as hay. The conventional process is to cut and condition the crop with a windrower, deposit it on the ground to dry, bale the crop when appropriately dry, and then position the bales in stacks for storage or transportation. High labor requirements and increasing costs of manual handling of bales have caused a growing number of commercial growers to abandon their small square bale operation for a large bale package, such as round bales, or large rectangular bales 3'×3', 3'×4', or 4'×4' in cross-section. Commercial haulers prefer large square bales over small square bales because they can drive into a field and be loaded for a cross-country trip in less than an hour. Large rectangular bales are loaded onto flat-bed trucks or semi-trailers directly in the field at about 20 tons per man-hour. It is these large rectangular bales that have become increasingly popular over the last several years, and to which this invention is most concerned.

While a pull-type machine could be designed and built to accomplish the desired tasks of loading, hauling and stacking large rectangular bales, it is most practical to develop a self-propelled unit, using a generally available truck cab and chassis as the source of motive and hydraulic power. Some mechanical devices for loading, hauling and stacking these large rectangular bales have been developed, however, they are unable to stack high enough, do not have the capability to lay various tie tiers, greatly overload the front axle of the unit, and do not have adequate traction on rolling or wet terrain when loaded.

Therefore, there is a need in the art for a convenient and automated system for loading a significant number of large rectangular bales onto a vehicle, using tie tiers, hauling them relatively long distances, and stacking the bales in a stable manner, and doing so with adequate traction in all types of terrain without overloading the front axle of the vehicle.

SUMMARY OF THE INVENTION

Accordingly, it is an object of the present invention to provide a bale wagon that automatically loads, hauls and stacks large rectangular bales.

Another object of the present invention is to provide an automatic bale wagon for large rectangular bales that is structured such that it provides adequate traction on rolling or wet terrain.

Another object of the present invention is to provide an automatic bale wagon for large rectangular bales that does not overload the front axle of the unit.

It is another object of the present invention to provide an automatic bale wagon for large rectangular bales that uses a truck chassis as the main support and source of motive power.

Yet another object of the present invention is to provide a bale wagon based on an over-the-road truck chassis that loads, hauls and stacks large rectangular bales, some in tie tiers, with a robotic arm.

It is yet another object of the present invention to provide a bale wagon that uses a robotic arm to load and stack large rectangular bales onto a load rack that tilts approximately 90 degrees for placing the formed stack onto the ground.

It is yet another object of the present invention to provide a robotic arm for large rectangular bales that rotates the bale into the load's fore-and-aft orientation before the bale is moved over the load rack. The bale is then manipulated to the desired position and at the desired tier orientation and subsequently deposited on the load rack.

These and other objects are attained by providing a large rectangular bale loading, hauling and stacking vehicle that mounts on a production truck chassis. Loading is accomplished with a bale manipulator that can selectively pick up and rotate bales, depositing them in tiers on a load rack, some in tie tiers. The manipulator works in conjunction with a transverse pivoting mast along the length of which the manipulator is selectively movable. A stack of bales is thus formed on the load rack and later deposited at a storage site.

DESCRIPTION OF THE DRAWINGS

The advantages of this invention will be apparent upon consideration of the following detailed disclosure of the invention, especially when taken in conjunction with the accompanying drawings wherein:

FIG. 4a is a partial plan view of the bale pivot system with the control cylinder extended;

FIG. 4b is also a partial plan view of the bale pivot system with the control cylinder retracted;

FIG. 6a is a side plan view of the bale wagon of the present invention showing, inter alia, the backstop positioning a bale beside the bale wagon for grasping and pickup;

FIG. 7b is a side plan view of the bale wagon as shown in FIG. 7a;

FIG. 8a is a rear plan view of the bale wagon, similar to FIG. 7a, showing a bale pivoted onto the load rack in a transverse position;

FIG. 8b is a rear plan view of the bale wagon, similar to FIG. 8a, showing a second bale pivoted onto the first bale;

FIG. 8c is a rear plan view of the bale wagon, similar to FIG. 8a, showing a bale pivoted onto the load rack in a vertical position;

FIG. 8d is a rear plan view of the bale wagon, similar to FIG. 8b, showing a second bale pivoted onto the load rack in a vertical position;

DESCRIPTION OF THE PREFERRED EMBODIMENT

Figure 1:
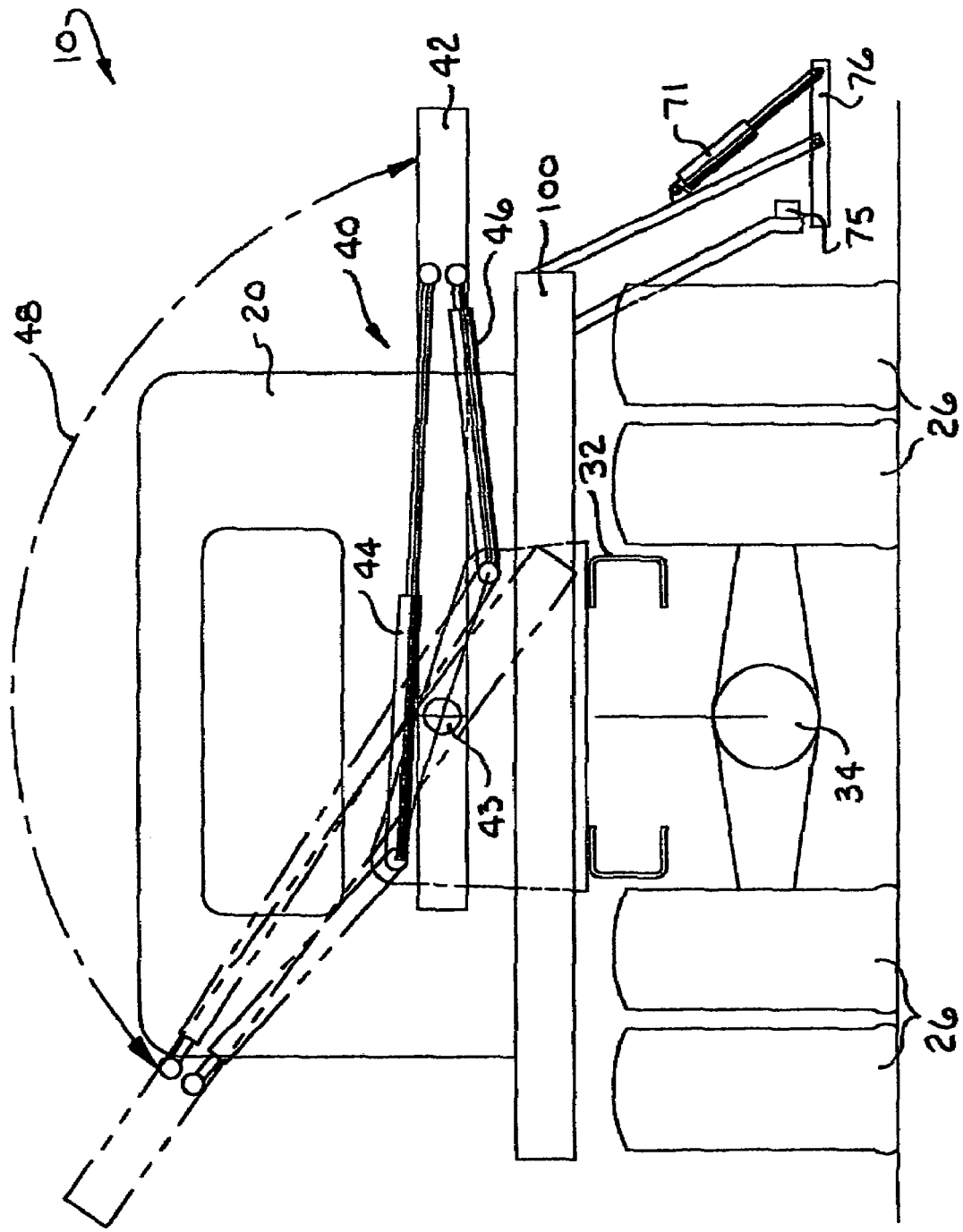
FIG. 1 is a rear plan view of the bale wagon of the present invention.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

FIG. 6a provides a good general side depiction of a truck cab 20 and chassis 24 with the primary components of the bale wagon 10 mounted thereon. Chassis 24 includes several components well known in the art, including wheel pairs 26, 28 and 30 affixed to and supporting a main frame 32. The wheel pairs are supported on axles (see, for example, drive axle 34 in FIG. 1) and other well known drive components (not shown). In this particular embodiment, as can be partially seen in FIG. 1, the rear wheel pairs 26, 28 are duals, i.e., two wheels on each end of the tandem axles, for improved traction in field conditions and heavy load support and distribution. Of course, a 4-wheel drive system would also work in this environment. A bale manipulator mechanism 40, to be described in further detail below, is mounted to the forward portion of chassis 24, behind cab 20. A load rack 100, also to be described further below, is pivotably attached to chassis 24 at pivot axis 62.

The embodiment to be described herein employs an over-the-road truck chassis based machine that loads, hauls and stacks large rectangular bales. The loading and stack building is accomplished with a robotic arm onto a load rack that tilts rearwardly approximately 90 degrees to place the formed stack onto the ground. In this embodiment the machine stacks 3'×4' bales six tiers high without overloading the front axles, and has good traction throughout the loading cycle. To reduce the overall length required, the robotic arm has the ability to rotate the bales into the load's fore-and-aft orientation before the bale is moved over the load rack. The bale is then manipulated to the desired position and with the desired tier orientation, and then deposited on the load rack.

Figure 2:
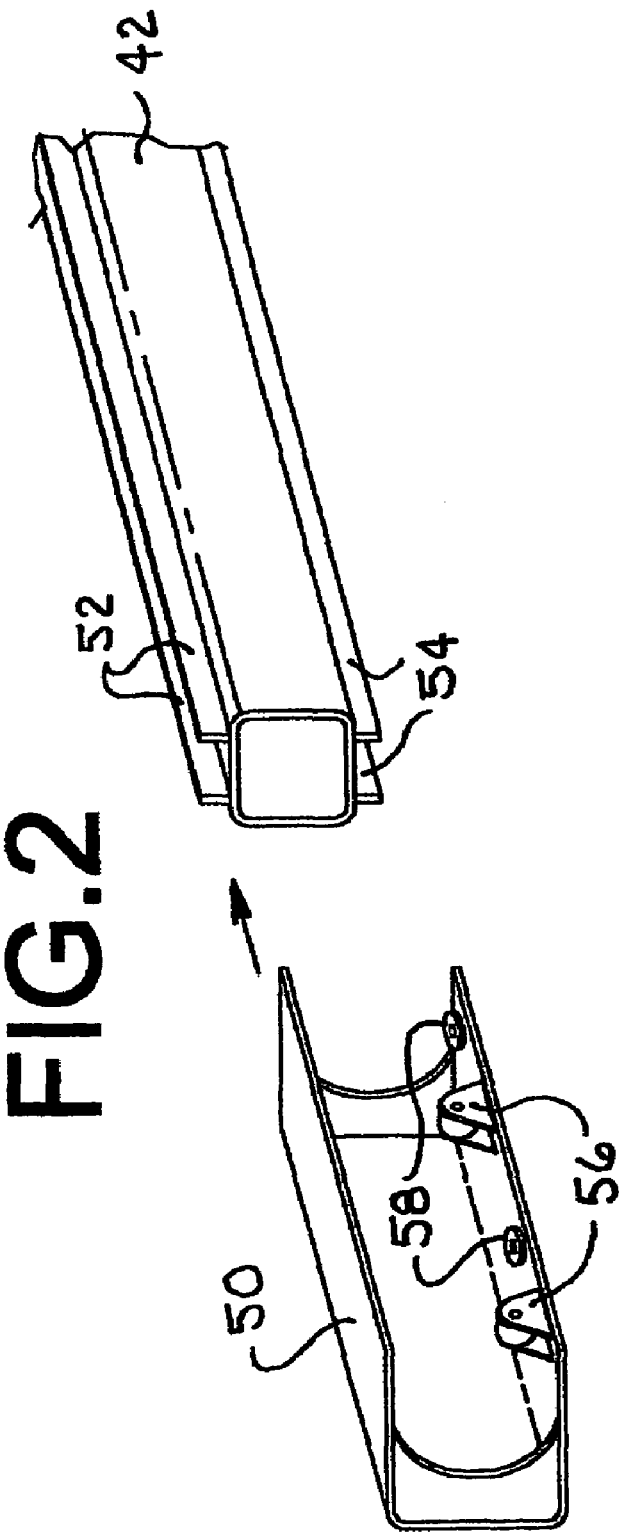
FIG. 2 is a partial isometric view of the carrier and mast, showing how the bale grasping mechanism attaches and moves.
Figure 3:
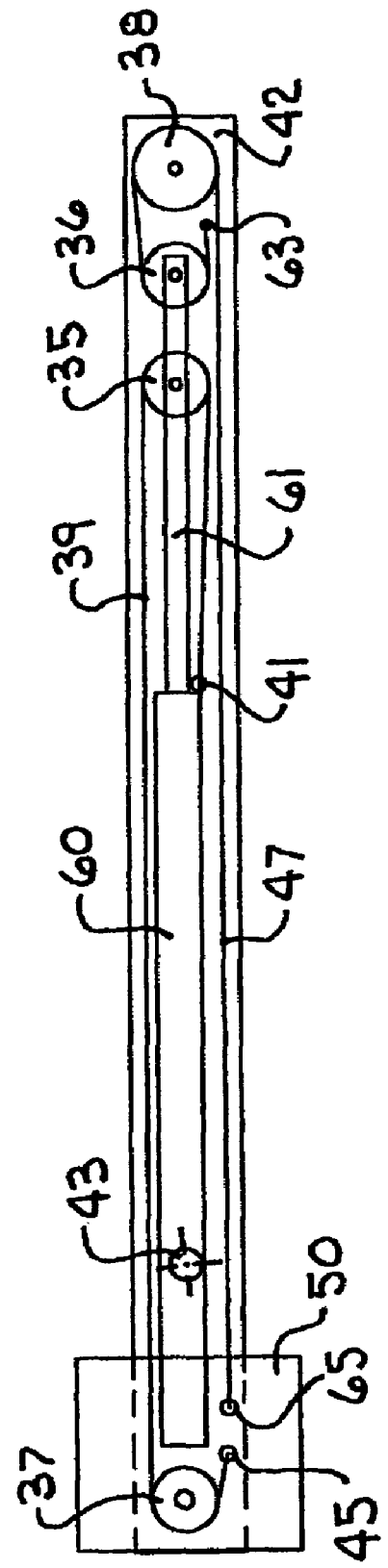
FIG. 3 is a partial plan view of the carrier travel system.
Figure 5:
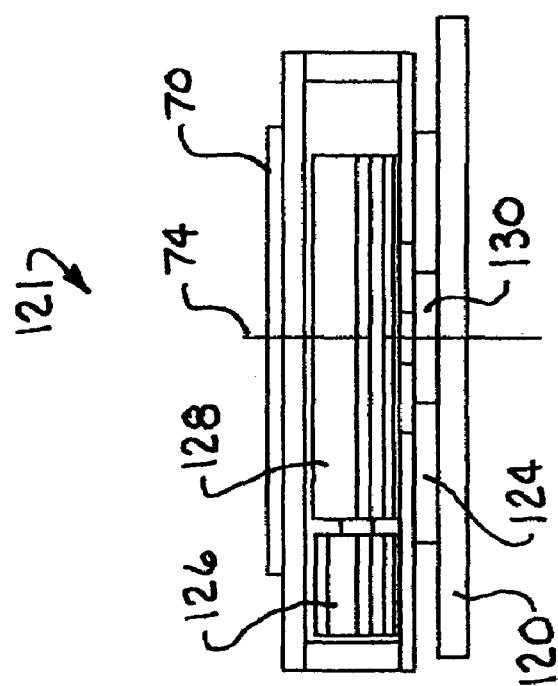
FIG. 5a is a partial front plan view of the bale rotation mechanism.
FIG. 5b is a partial top plan view of the bale rotation mechanism of FIG. 5a, taken generally along lines 5-5.
FIG. 5c is a partial side plan view of the vehicle showing the components of the bale manipulation mechanism.
Figure 5:
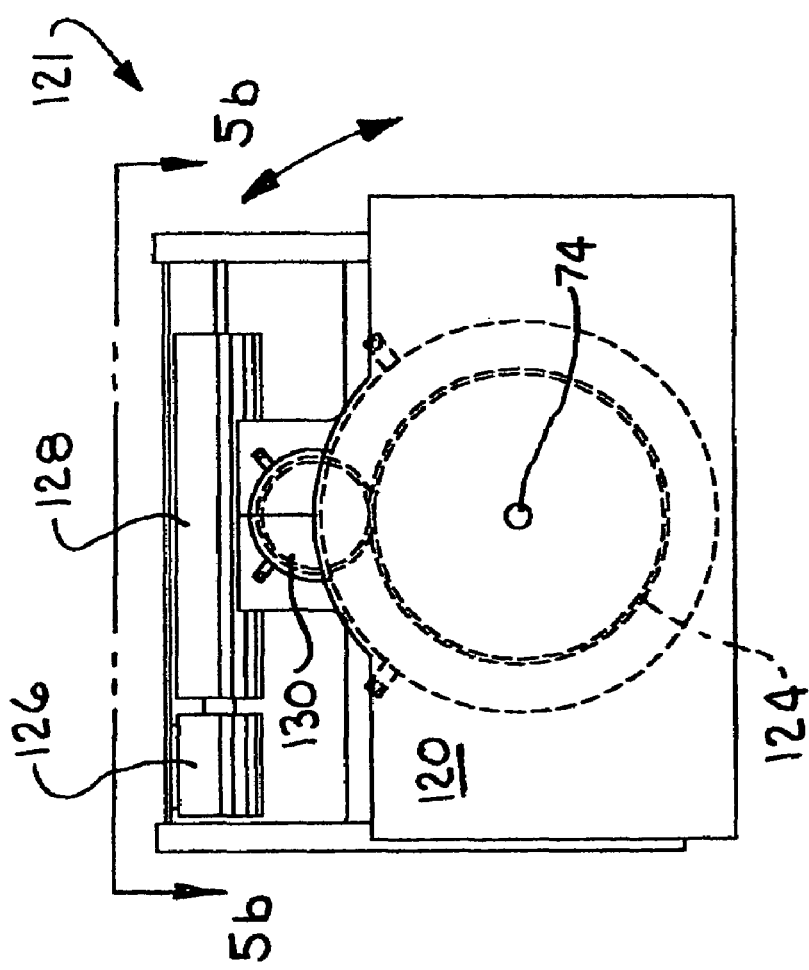
Figure 5C:
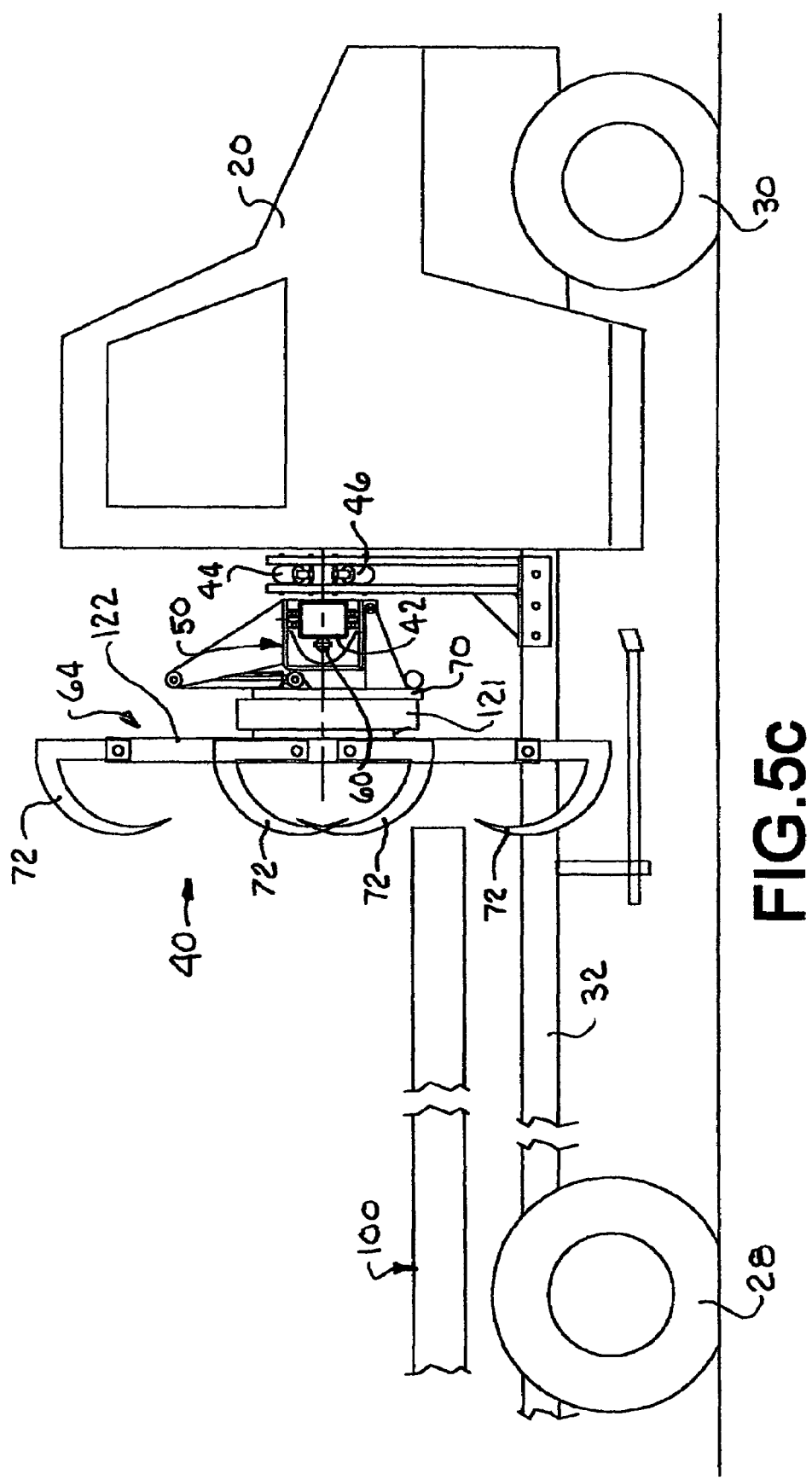

The figures and specification describe right side loading and 3'×4' bales; however, loading could be left side as well and the loader/stacker could be adjusted for other sized large rectangular bales. The bale manipulator mechanism 40 includes a simple main mast 42 that pivots about pivot 43 only in a plane generally perpendicular to the direction of travel of the unit (FIGS. 1, 6) under the power of mast hydraulic cylinders 44, 46. The range of travel of mast 42 is shown in FIG. 1 as arc 48. The bale manipulator mechanism 40 to which a bale grasping mechanism 64 (FIG. 5c) attaches, is mounted to a carrier 50 that engages and moves along the mast 42 on carrier tracks 52, 54 (FIGS. 2 and 3). As will be understood shortly, the large rectangular surface of carrier 50 is affixed to the bale rotation mechanism which is, in turn, affixed to the bale grasping mechanism 64. Opposing track roller pairs 56, 58, (opposing pairs on both the top and bottom inside faces of carrier 50, though only the bottom pairs shown) affixed to carrier 50 engage the insides of the carrier tracks to provide smooth and steady movement of the carrier in both directions under hydraulic control via cylinder 60 (FIG. 3). FIG. 3 shows the structure that moves carrier 50 back and forth along the length of mast 42 to include hydraulic cylinder 60 with movable cylinder rod 61 with two cylinder sprockets 35, 36 affixed thereto; one, 36, adjacent the end of the cylinder rod and the other, 35, spaced a short distance therefrom. A third sprocket, 37, is affixed to mast 42 adjacent the base end of hydraulic cylinder 60, and a fourth sprocket, 38, is affixed to mast 42 adjacent the outward end of the mast. A first chain 39 is affixed to carrier 50 at point 45, extends around sprockets 35 and 37 and is affixed at its second end to mast 42 at point 41. A second chain 47 is affixed to mast 42 at point 63, extends around sprockets 36 and 38 and is affixed at its second end to carrier 50 at point 65. Therefore, as cylinder rod 61 is extended, carrier 50 moves to the left (in FIG. 3), and as the cylinder rod is contracted, the carrier moves to the right. Thus, bale manipulator mechanism 40 (disregarding carrier movement along the mast) has two degrees of movement that make possible the bale positioning described above.

The first manipulator mechanism movement is a 90 degree pivot, via pivot mechanism 55, around an axis 66 (FIGS. 4a, 4b) parallel to mast 42, under the control of hydraulic cylinder 68 acting at one end through bracket 69 affixed to carrier 50, in order to move the bale grasping mechanism 64 from downward/outward facing to rear facing (FIG. 4b). This manipulates the bale in the proper fore-and-aft orientation for insertion onto the load rack 100. Mounting plate 70 in FIGS. 4a, 4b supports the bale grasping mechanism 64, which includes a plurality of pivoting claws 72 that may selectively grasp and hold, or release, the bale under the control of hydraulics. Such claws are arranged in pairs so that they engage near the fore-and-aft ends of an 8' long bale and, also for additional support of the long bale, intermediate pairs that engage the bale intermediate of the ends.

The second movement of the manipulator mechanism is through rotation mechanism 121 (FIGS. 5a, 5b and 5c) which is sandwiched between mounting plate 70 of the pivot mechanism 55 and faceplate 122 of the grasping mechanism 64. The rotation mechanism rotates the bale grasping mechanism 64 around a pivot that is perpendicular to and approximately in the center of the faceplate 122 of the bale grasping mechanism. Rotation about an axis 74 that extends through or near the center of mass of the bale minimizes the torque required to rotate the bale. This is accomplished, for example, by a modified production fork lift attachment that rotates the tines of the lift. A plate 120 is rotatably affixed to faceplate 122 about axis 74 as gear 124 rotates. A hydraulic motor and directional valve 126 rotates gearing 128 that, in turn, rotates gear 130 engaged with gear 124 (this rotation mechanism is shown best in FIGS. 5a-5c, and is not shown in other figures to reduce complexity and improve understanding). Rotation about axis 74 is used to place the bale in the crosswise or vertical orientation as it is placed on the load rack 100. Angular positioning of the mast 42 and movement of the carrier 50 along the mast are also required for positioning the bale on the load rack in the forming of the desired tier pattern (FIGS. 1, 2 and 3).

A component important for the loading and stack building operation include a backstop 76 to position the bale beside the unit for grasping and pickup. Backstop 76 is attached to the main frame 32, depends therefrom, and extends transversely to the direction of travel for a distance substantially equal to the width of a bale. The backstop also is adjustable in a fore-and-aft direction to center shorter bales for proper grasping by mechanism 64.

Figure 9:
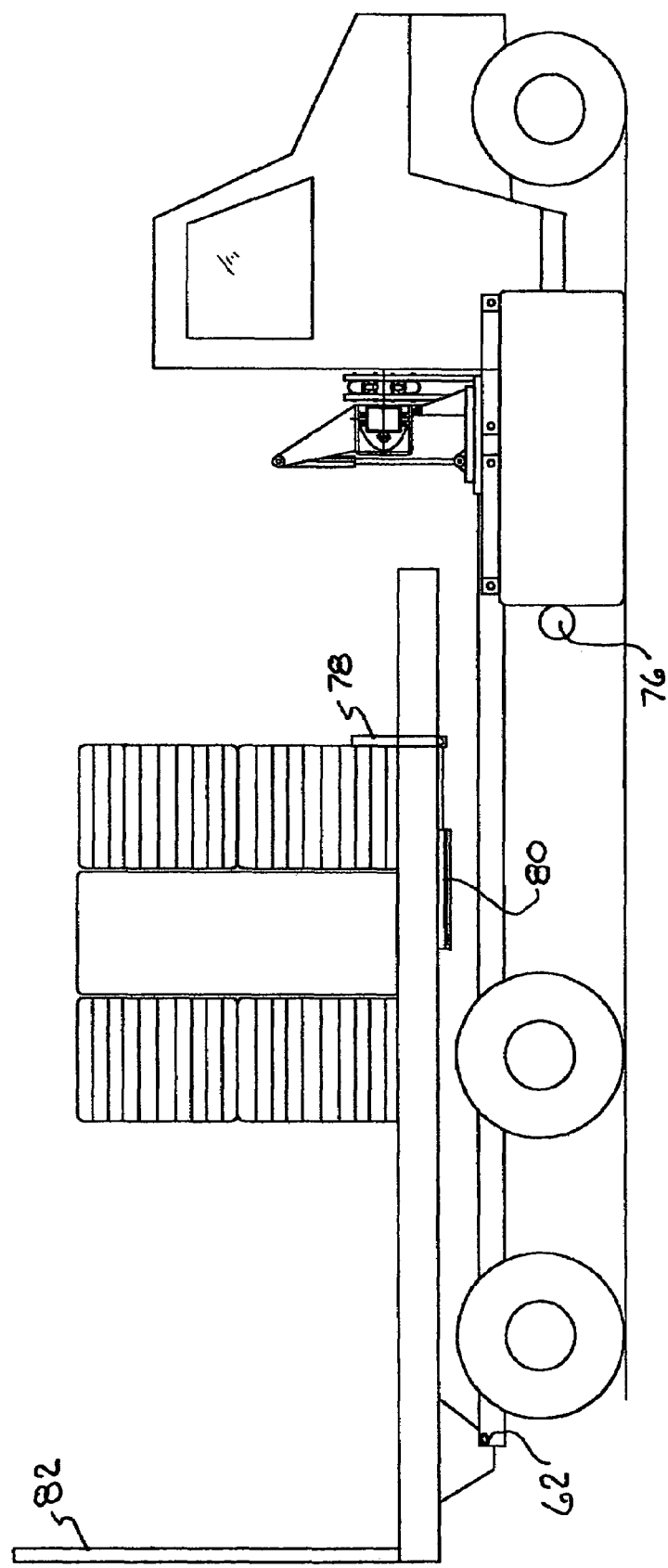
FIG. 9 is a side plan view of the bale wagon, showing alternate tiers of bales, horizontal-vertical-horizontal, being pushed rearwardly by the push bar.

Another component useful in stack building is a push bar 78 to push each succeeding tier rearwardly on the load rack 100 until the load is complete (FIG. 9). Push bar 78 extends transversely to the line of travel of the unit, and is moved through the extension and retraction of hydraulic cylinder 80. The push bar need not extend much beyond the level of the load rack and, in fact, is low enough in its forward position to allow bales maneuvered by the bale manipulator mechanism 40 to be positioned rearwardly of the push bar without interference therebetween. In the alternative, push bar 78 may be easily made to pivot downwardly when moved in the forward direction (away from bales on the load rack 100).

Finally, a plurality of tines 82 is affixed to the rear of load rack 100 to hold the load while tipping to place the completed stack on the ground and a push-off bar 84. Load rack 100 is pivoted about pivot point 62 by hydraulic cylinder 83 between loading and unloading positions. Push-off bar 84 is powered by hydraulic cylinder 86 that pivots arm 88 about pivot point 90 to move bar 84 in an arc about point 90 to push the bale stack rearwardly, as the bale wagon 10 is driven forwardly, off of tines 82 onto the ground.

Automation is accomplished by using a controller 140 integrated with position feedback sensors S1 through Sn and electrically controlled hydraulic valves V1 through Vm. The controller synchronizes movements and positions of the bale grasping mechanism, the rotation mechanism, the mast, the carrier and other components throughout the loading and stack building process. The sensors are preferably electric, but can be any type that can meet reliability and endurance requirements. A visual display 142, with or without a touch screen, makes the setup and operation reasonably simple for the operator. The controller also has preset programs for the different sized bales and for different tie tier patterns. It would be desirable for the controller to have a "teach and repeat" capability for unforeseen stack building requirements.

Figure 7A:
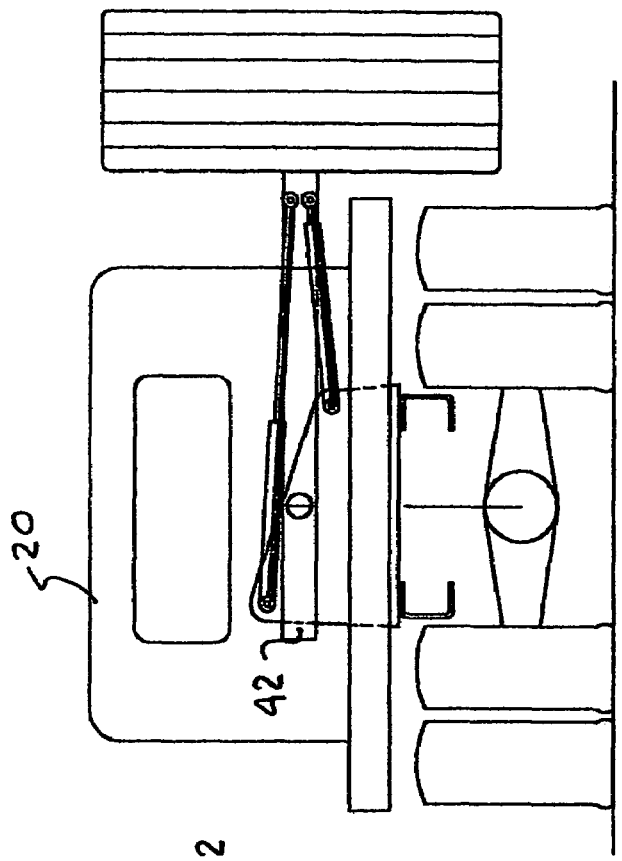
FIG. 7a is a rear plan view, similar to FIG. 6b, with the bale pivoted vertically.
Figure 6B:
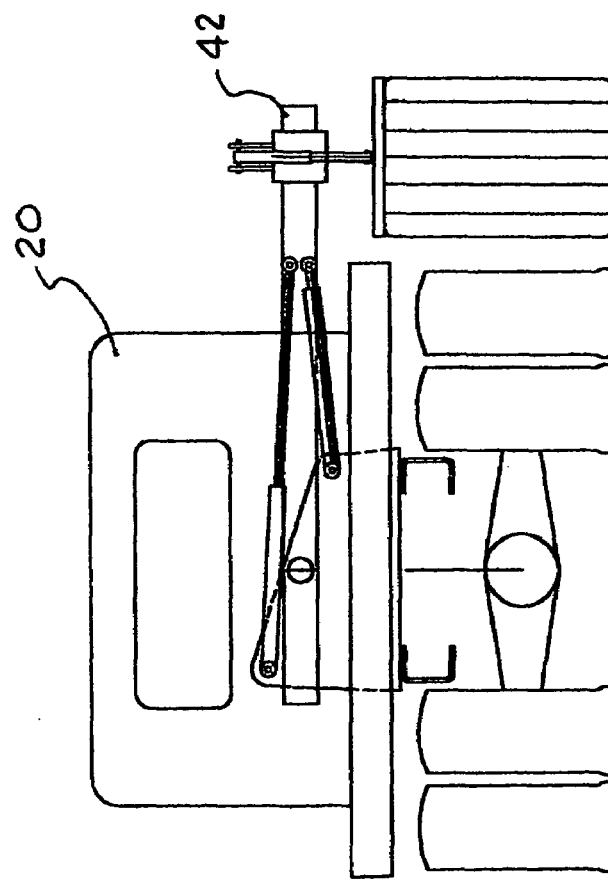
FIG. 6b is a rear plan view of the bale wagon of FIG. 6a, with the backstop removed and the bale clamped by the grasping mechanism.
Figure 7B:
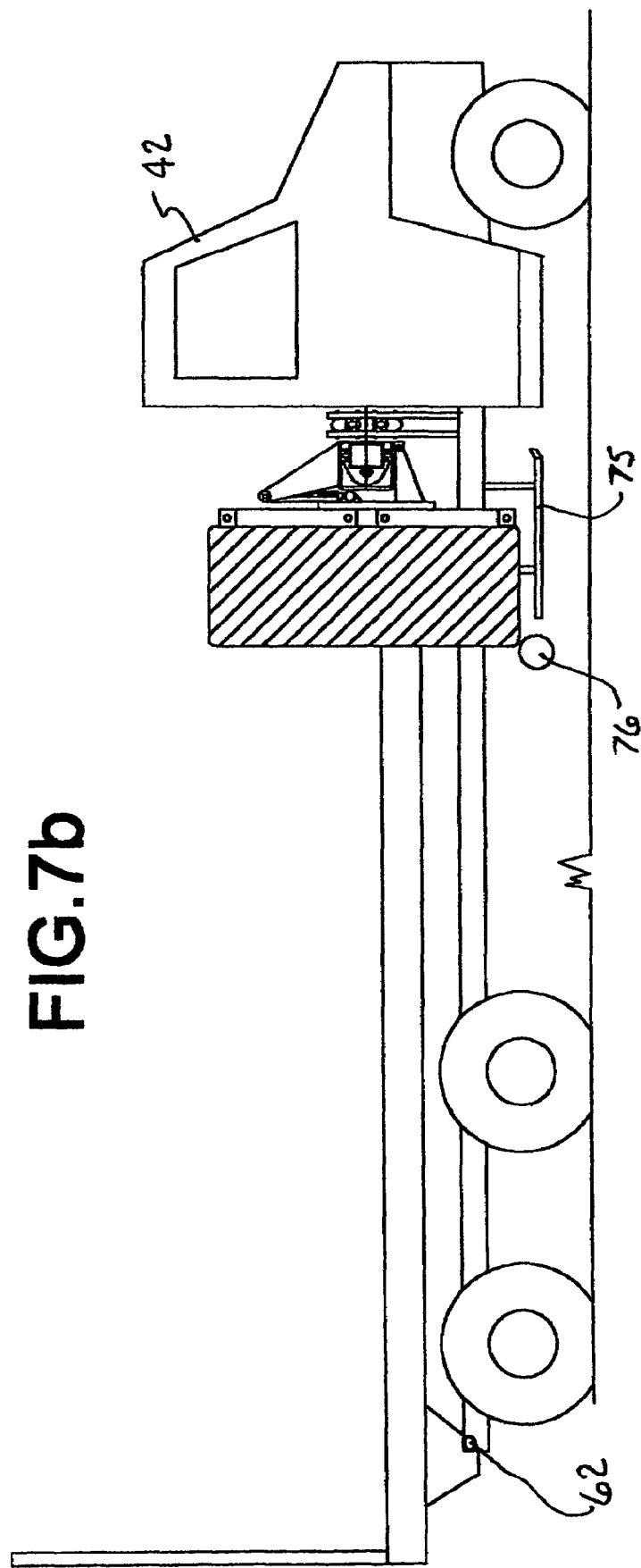

In operation, the truck, with the bale handling components described above, approaches the bale to be loaded in the same direction as the baler traveled through the field (approaching the bale along its lengthwise axis). The truck is driven so that the bale is located against the side guide 75 (FIG. 7b) and against the backstop, and the operator or a switch on the backstop initiates the loading cycle (FIGS. 6a and 6b). Backstop 76 may be pivotably mounted to the chassis and movable between operative and transport positions as shown in FIG. 1. Side guide 75 is fixed to the chassis and is an elongate strap or rod and positioned to guide the bale into proper contact with bale stop 76. The grasping mechanism 64 is moved from the ready position inboard of the chassis outer limits, grasps the bale with claws 72, lifts the bale clear of backstop 76, and then pivots the bale rearwardly, through action of pivot mechanism 55, and upwardly to the fore-and-aft orientation of the loaded bales (FIGS. 7a and 7b). The bale is then moved to the desired tier location through movements of mast 42, carrier 50, and rotation mechanism 121 (FIGS. 8a, 8b, 8c and 8d). Arrow 110 depicts the general paths of bale centroids as the bales are manipulated in various configurations on the load rack 100. Arrow 112 depicts the rotation of the various bales relative to the mast 42 and carrier 50 to obtain the proper tier orientation. Grasping mechanism 64 is then released and the mast moves the grasping mechanism out from over load rack 100, and the grasping mechanism is then pivoted to a ready position for the next bale. When a tier is complete, it is pushed rearwardly with push bar 78. These steps are repeated until the load is complete (FIG. 9).

Figure 10:
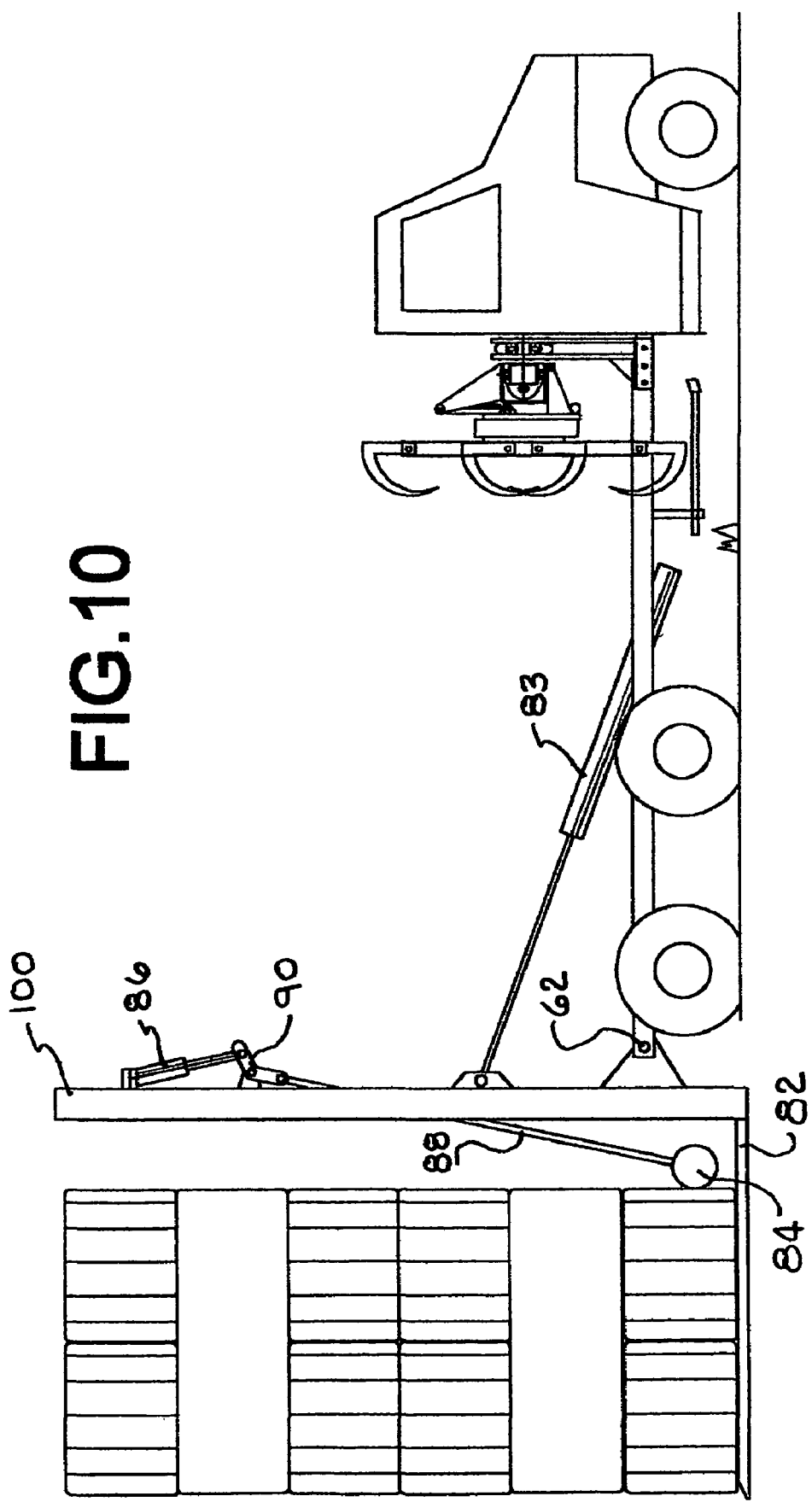
FIG. 10 is a side plan view of the bale wagon, showing a stack of bales being pushed rearwardly off the load tines by the push-off bar onto the ground.
Figure 11:
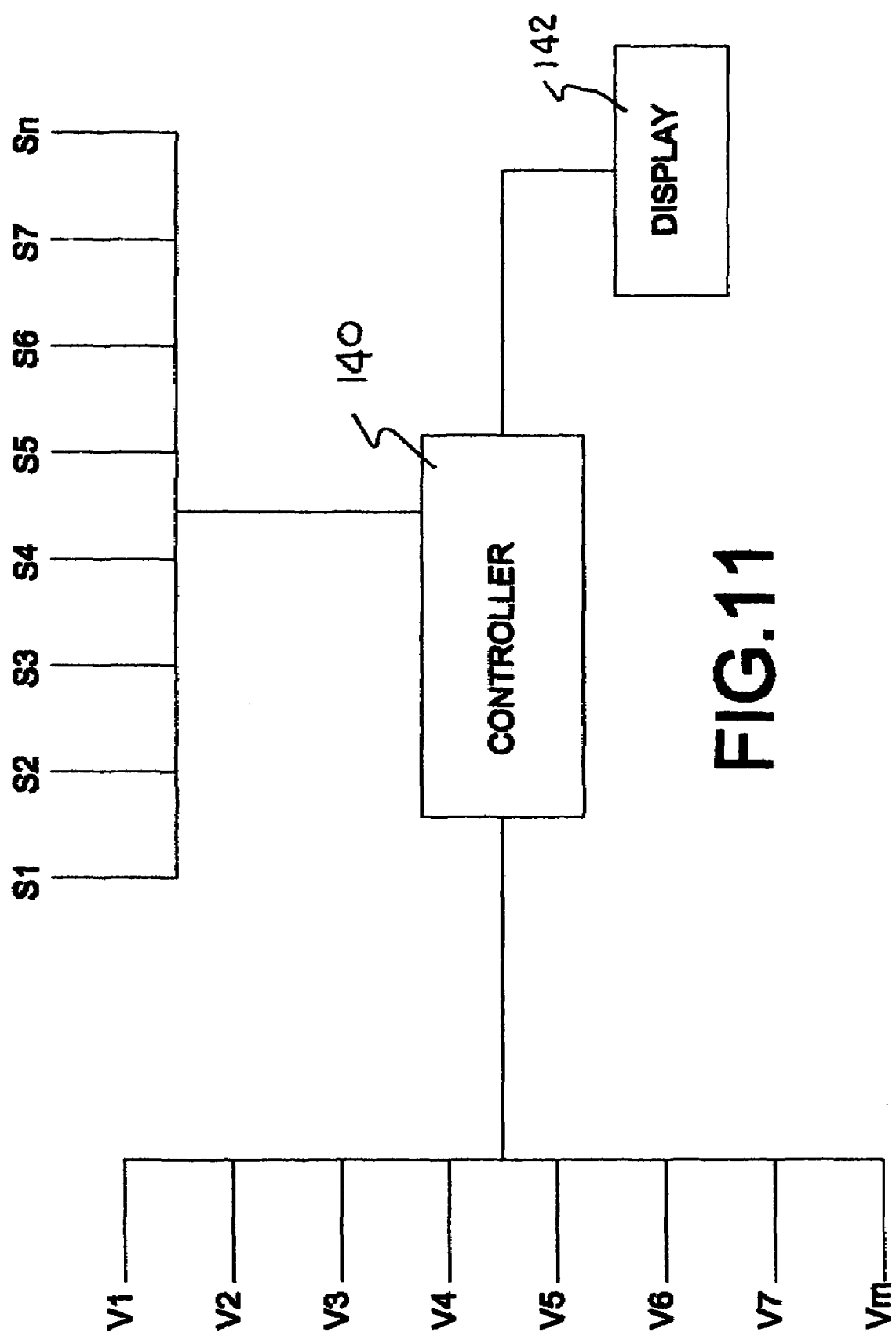
FIG. 11 is a schematic of a control system to manage the creation of bale stacks.

When the load is completed, the mast remains stored upright and the backstop is retracted for transport by, for instance, retraction of hydraulic cylinder 71. The completed stack is placed at the storage location by tilting the load rack 90 degrees and then pushing the truck away with the push-off bar (FIG. 10).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A vehicle for loading, hauling and stacking large rectangular bales comprising:
    an elongate fore-and-aft extending truck chassis having a first end, an opposing second end and a longitudinal axis;
    an elongate load rack with a front end and an opposing rear end, said front end adjacent, but spaced from, said first end of said chassis and extending toward said second end of said chassis, said rear end of said load rack generally adjacent said second end of said chassis, said load rack further having a generally planar bale-supporting surface;
    a bale manipulation mechanism supported by said chassis generally between said first end of said chassis and said front end of said load rack;
    said bale manipulation mechanism including:
        an elongate mast having an inward end and an opposing outward end, said mast pivotably supported by said chassis adjacent said inward end of said mast for rotation limited to rotation about a fixed axis parallel to the longitudinal axis and rotation limited to within a plane generally perpendicular to said longitudinal axis of said chassis;
        a carrier attached to said mast for selective movement along the length of said mast generally between said inward and outward ends, the carrier further comprising:
            a faceplate;
            a pivoting device for selectively pivoting said faceplate between a first position directed generally parallel to said longitudinal axis of said chassis and a second position generally 90 degrees downwardly;
            a rotation mechanism for selectively rotating said faceplate about an axis generally perpendicular to said faceplate, wherein said rotation mechanism can rotate a bale about an axis parallel to the axis of rotation of the mast and within a plane perpendicular to the longitudinal axis; and
            a bale grasping device affixed to said faceplate and capable of grasping and holding a bale during manipulation thereof; and
    a plurality of tines affixed to said rear end of said load rack, whereby said bale grasping device may grasp and pick up a single bale from the ground, lift it, move it toward said pivot location of said mast and selectively rotate the bale, and deposit it on said load rack, thereby building a stack of bales on said load rack.

2. The vehicle of claim 1, wherein:
the components of said bale manipulation mechanism are each hydraulically powered.

3. The vehicle of claim 2, wherein:
said hydraulic power is in the form of a plurality of hydraulic cylinders.

4. The vehicle of claim 3, further including:
a programmable controller supported on said chassis;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

5. The vehicle of claim 4, wherein:
said controller has a visual display connected thereto.

6. The vehicle of claim 5, further including:
an operator's cab affixed to the first end of said chassis.

7. The vehicle of claim 6, further including:
at least three sets of axles and associated wheels affixed to and supporting said chassis, one set generally under said cab and the other two sets under said load rack.

8. The vehicle of claim 7, wherein:
said associated wheels and axles under said load rack are duals.

9. The vehicle of claim 1, further including:
a programmable controller supported on said chassis;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

10. The vehicle of claim 9, wherein:
said controller has a visual display connected thereto.

11. A manipulation mechanism for large rectangular bales, comprising:
an elongate wheel-supported chassis having a front end, an opposing rear end and a longitudinal axis;
an elongate mast having an inward end and an opposing outward end, said mast pivotably supported by said chassis adjacent said inward end of said mast for rotation limited to rotation about a fixed axis parallel to the longitudinal axis and rotation limited to within a plane generally perpendicular to said longitudinal axis of said chassis;
a carrier attached to said mast for selective movement along the length of said mast generally between said inward and outward ends, said carrier further comprising:
a faceplate;
a pivoting device for selectively pivoting said faceplate between a first position directed generally parallel to said longitudinal axis of said chassis and a second position generally 90 degrees rearwardly and upwardly;
a rotation mechanism for selectively rotating said faceplate about an axis generally perpendicular to said faceplate, wherein said rotation mechanism can rotate a bale about an axis parallel to the axis of rotation of the mast and within a plane perpendicular to the longitudinal axis; and
a bale grasping device affixed to said faceplate and capable of grasping and holding a bale during manipulation thereof; and a plurality of tines affixed to said rear end of said load rack, whereby said bale grasping device may grasp and pick up a single bale from the ground, lift it, move it toward said pivot location of said mast and selectively rotate the bale, and deposit it on said load rack, thereby building a stack of bales on said load rack.

12. The manipulation mechanism of claim 11, wherein:
the components of said bale manipulation mechanism are each hydraulically powered.

13. The manipulation mechanism of claim 12, wherein:
said hydraulic power is in the form of a plurality of hydraulic cylinders.

14. The manipulation mechanism of claim 13, further including:
a programmable controller;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

15. The manipulation mechanism of claim 14, wherein:
said controller has a visual display connected thereto.

16. The manipulation mechanism of claim 11, further including:
a programmable controller;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

17. The manipulation mechanism of claim 16, wherein:
said controller has a visual display connected thereto.

18. A manipulation mechanism for large rectangular bales, comprising:
an elongate fore-and-aft extending wheel-supported chassis having a first end, an opposing second end and a longitudinal axis;
an elongate mast having an inward end and an opposing outward end, said mast pivotably supported by said chassis adjacent said inward end of said mast for rotation limited to rotation about a fixed axis parallel to the longitudinal axis and rotation limited to within a plane generally perpendicular to said longitudinal axis of said chassis;
a carrier affixed to said mast and selectively movable along the length thereof generally between said first and second ends thereof, said carrier further comprising:
a faceplate;
a rotation mechanism for selectively rotating said faceplate about an axis generally perpendicular to said faceplate, wherein said rotation mechanism can rotate a bale about an axis parallel to the axis of rotation of the mast and within a plane perpendicular to the longitudinal axis; and
a bale grasping device affixed to said faceplate and capable of grasping and holding a bale during manipulation thereof, whereby bales may be picked up and manipulated.

19. The manipulation mechanism of claim 18, wherein:
said chassis is a wheel-supported truck chassis with a forward end and an opposing rearward end, and a cab affixed to said forward end thereof; and
said manipulation mechanism is affixed to and supported by said chassis adjacent said cab toward said rearward end of said chassis.

20. The manipulation mechanism of claim 19, wherein:
the components of said bale manipulation mechanism are each hydraulically powered.

21. The manipulation mechanism of claim 20, wherein:
said hydraulic power is in the form of a plurality of hydraulic cylinders.

22. The manipulation mechanism of claim 21, further including:
a programmable controller supported on said chassis;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

23. The manipulation mechanism of claim 22, wherein:
said controller has a visual display connected thereto.

24. The manipulation mechanism of claim 23, further including:
at least three sets of axles and associated wheels affixed to and supporting said chassis, one set generally under said cab and the other two sets under said load rack.

25. The manipulation mechanism of claim 24, wherein:
said associated wheels and axles under said load rack are duals.

26. The vehicle of claim 1, further comprising:
first and second mast hydraulic cylinders pivotally mounted at their first ends to the chassis and pivotally mounted at their second ends to the mast, wherein the cylinders rotate about parallel axes.

27. The vehicle of claim 1, wherein:
the pivoting device for selectively pivoting said faceplate between a first position and second position; is comprised of a hydraulic cylinder pivotally attached at a first end to the face plate, and at a second end to a bracket attached to the carrier.

* * * * *